United States Patent [19]

Coppola et al.

[11] 4,186,723

[45] Feb. 5, 1980

[54] CONTOURED INSULATION WINDOW FOR EVACUATED SOLAR COLLECTOR

[75] Inventors: Frank T. Coppola, Horseheads; William P. Lentz, Addison; Robert V. VanDewoestine, Corning, all of N.Y.

[73] Assignee: Corning Glass Works, Corning, N.Y.

[21] Appl. No.: 894,899

[22] Filed: Apr. 10, 1978

[51] Int. Cl.² .............................. F24J 3/02; E04B 7/18
[52] U.S. Cl. ...................................... 126/443; 52/200; 52/630; 52/796; 52/788; 126/447
[58] Field of Search .............. 126/270, 271; 237/1 A; 52/200, 630, 796, 788; 165/171, 170

[56] References Cited

U.S. PATENT DOCUMENTS

| 1,126,135 | 1/1915 | Vandorn | 52/630 |
| 3,918,226 | 11/1975 | Naidus | 52/200 |
| 3,986,491 | 10/1976 | O'Hanlon | 126/271 |
| 4,055,163 | 10/1977 | Costello et al. | 126/271 |
| 4,085,734 | 4/1978 | Gibbs | 126/271 |

FOREIGN PATENT DOCUMENTS

| 2518926 | 11/1976 | Fed. Rep. of Germany | 126/271 |
| 431002 | 8/1967 | Switzerland | 52/200 |

Primary Examiner—James C. Yeung
Attorney, Agent, or Firm—Burton R. Turner; John P. DeLuca

[57] ABSTRACT

An insulating contoured window is provided for use with an enclosed chamber such as an evacuated flat plate solar heat collector with the contoured solar window being of minimum thickness and supported solely about its peripheral edge portions. The window is contoured in both its longitudinal and transverse directions, such that in its longitudinal direction the window is composed of a plurality of sinusoidal corrugations whereas in its transverse direction the peaks of such corrugations are contoured in the form of paraboloids so that the structure may withstand the forces generated thereon by the atmosphere.

5 Claims, 6 Drawing Figures

CONTOURED INSULATION WINDOW FOR EVACUATED SOLAR COLLECTOR

BACKGROUND OF THE INVENTION

The efficiency of solar heat collectors is affected by the amount of convection, conduction and radiation losses associated with its construction. It has been found that heat losses due to convection and conduction may be materially reduced by evacuating the air space within the solar collector about the absorber or collector plate. However, in the case of standard flat plate solor heat collectors having standard sized flat plate absorbers, it has not been possible to evacuate such collectors and provide a single solar window over the same which is supported solely about edge portions thereof, due to the atmospheric load which is exerted thereon upon evacuation of the collector. That is, with a standard atmospheric pressure of about 15 lbs./sq. in., an evacuated relatively shallow solar collector structure will have an atmospheric pressure of approximately one ton per square foot on the collector window.

Realizing that it was impossible to subject the standard flat window of a flat plate heat collector to such forces without catastrophic failure, the prior art devices such as shown in U.S. Pat. No. 3,929,122 and No. 3,974,823 utilized two solar windows spaced apart from one another to form a dead air space between the ambient atmosphere and the interior of the solar collector containing the absorber plate. Although the dead air space provided a degree of insulation, convection and conduction heat losses of significant magnitude were still experienced.

In order to provide the desired vacuum within the solar collector so as to minimize convection and conduction heat losses from the absorber plate through the collector window to the ambient atmosphere, tubular solar collectors were utilized as shown in U.S. Pat. No. 3,227,153. The use of the tubular construction, which is strong in compression, permitted the evacuation of the solar collector and thereby materially reduced heat losses due to convection and conduction. However, the diameter of the solar collector was of course limited to practical aspects which accordingly limited the area of the flat plate collector or absorber member retained therein. Thus, in order to obtain the same surface area as was obtainable with a standard flat plate collector of a relatively large shallow structure, it was necessary to provide a multiplicity of such tubular collectors.

Other attempts have been made in supporting expansive flat solor windows in evacuated flat plate collectors, such as utilizing support posts as shown in U.S. Pat. No. 3,995,615 and longitudinally extending partition walls as shown in U.S. Pat. No. 4,038,965. Although the support posts of the former patent permit utilization of a standard flat plate collector, each of the support posts in fact functions as a conductor to conduct heat to the window and thus to the ambient atmosphere. In the case of the latter patent, the plurality of longitudinal partitions necessitate the utilization of a plurality of small collector plates similar to that used in the evacuated tubular collector, and again such partitions function as conductors or heat sinks to the solar window with the resultant loss of efficiency.

U.S. Pat. No. 3,986,491 discloses the use of a sheet of transparent or translucent corrugated plastic positioned above and across a metallic heat collecting surface having hills and valleys, with the corrugation as far as possible focusing the rays of the sun on one side of the flaring hills in the morning and focusing the solar rays on the opposite side of the hills during the afternoon. However, the solar collector is not evacuated, as an air space is provided within the collector between the transparent or translucent plastic solar window and the metallic collector plate.

Accordingly, the present invention has overcome the problems of providing an evacuated flat plate collector with a substantially continuous solar window which is supported solely about peripheral portions and which will withstand the atmospheric forces exerted thereon by utilizing a contoured solor window having a sinusoidal longitudinal cross section and a parabolic transverse cross section.

SUMMARY OF THE INVENTION

In its simplest form, the present invention is directed to a contoured insulating structure or cover for an enclosed chamber and an evacuated flat plate solar collector utilizing such structure in the form of a solar window. The solar window is supported solely about its peripheral portions and in order to withstand the pressures exerted thereon by the atmosphere, the window is sinusoidally corrugated along its longitudinal extent and, in order to form a beam which will withstand the atmospheric pressure with a minimum of glass deformation, the upwardly extending corrugations are each contoured transversely of the window in the form of a paraboloid. Thus, it is possible to form a continuous window for an evacuated flat plate collector which is of a minimum thickness and weight, but yet will withstand the forces of atmospheric pressure being exerted thereon.

The problem of producing a continuous solar window for an evacuated solar collector not only resides in the production of such a window which will not fail when subjected to atmospheric pressure, but in forming such a window with a minimal thickness so as to minimize the weight of the collector and facilitate transmission through the window. Since many solar collectors are mounted upon roof portions of residential or commercial buildings, it is necessary from a pure structural and economic standpoint to limit the amount of weight incorporated within the solar collector, and thus minimal solar window thickness is desired. Further, transmission is certainly enhanced and refraction reduced by utilizing minimal thickness solar windows.

It is preferred to produce the contoured solar window of the present invention from a glass having a relatively high tensile strength and a minimum MOR of about 10,000 psi so that the required thickness may be held at a minimum. For example, the thickness of a flat plate window having a width of 24" required to withstand an atmospheric pressure of 15 psi will vary depending on the type of glass used and its MOR. That is an annealed glass having a maximum MOR of about 1000 psi would require a thickness of about $2\frac{1}{2}$", whereas a thickness of about 1.5" would be required with a tempered glass having a maximum allowable stress or MOR of about 3000 psi, and only about an 0.8" thickness would be required with a chemically or laminated strengthened glass having a MOR of about 10,000 psi. Thus, although such glass thicknesses are impractical both optically and economically, the foregoing calculated results illustrate the desirability of utilizing a glass having a relatively high MOR or maximum allowable stress so as to minimize the required thickness thereof.

In order to further reduce the thickness of a glass window within an evacuated flat plate solar collector and still maintain its required strength, the window is corrugated sinusoidally along its longitudinal extent with the peaks being curved parabolically along its lateral extent. Assuming a corrugation peak-to-valley height of 5", a sheet width of 24", a sheet length of 96", a load of 15 psi and a glass density of 0.09 lbs./in.$^3$, the thickness and weight for a sheet which would support atmospheric pressure are given in Table I.

TABLE I

| Type of Glass | Maximum. Allowable Stress | Thickness | Weight 2' × 8' Formed Sheet |
|---|---|---|---|
| Annealed | 1,000 psi | .864" | 178.8 lb |
| Tempered | 3,000 psi | .288" | 59.7 lb |
| Laminated or Chemically Strengthened | 10,000 psi | .086" | 17.9 lb |
| Laminated or Chemically Strengthened | 20,000 psi | .043" | 9.0 lb |

Table I shows the advantages of the contoured sheet of the instant invention over ordinary flat sheet. That is, the thickness of a flat sheet having an MOR or maximum permissible stress of 10,000 psi required to support the same load as the instant contoured sheet is 0.81", and its weight is 168 pounds, as compared to 0.086" and a weight of 17.9 pounds for the contoured sheet of the present invention. Thus, for the same conditions and a 10,000 psi working stress, the contoured sheet weighs 1/9 as much as flat sheet.

It thus has been an object of the present invention to provide a new insulating structure such as a solar window for evacuated flat plate solar collectors which has a contoured sinusoidal curvature in the longitudinal direction and a parabolic contour in the lateral or transverse direction providing a window of minimum glass thickness which withstands atmospheric exerted thereon.

DESCRIPTION OF THE PREFERRED EMBODIMENTS

Figure 1:
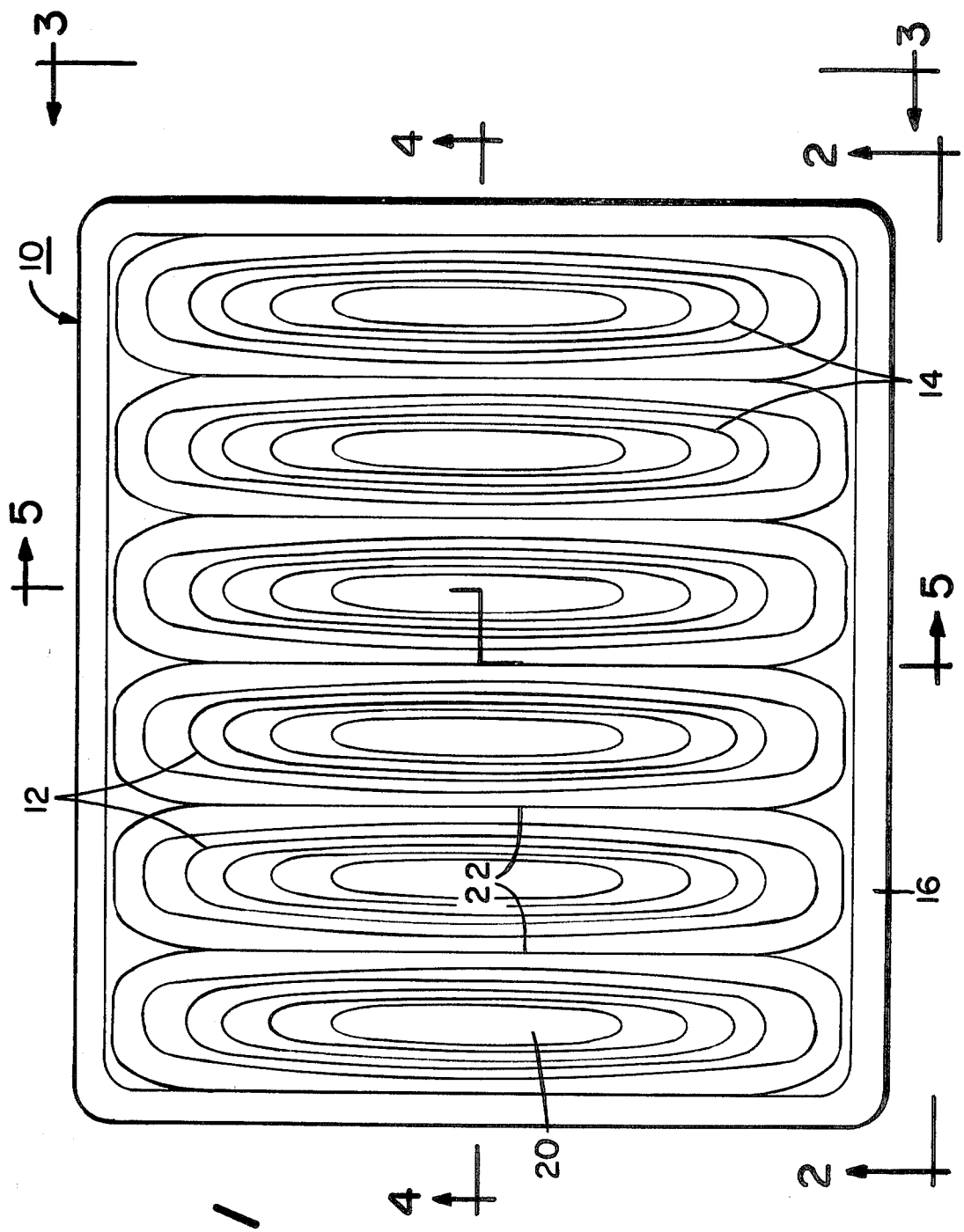
FIG. 1 is a somewhat schematic contour line drawing of the top plan view of a solar window embodying the present invention.
Figure 2:
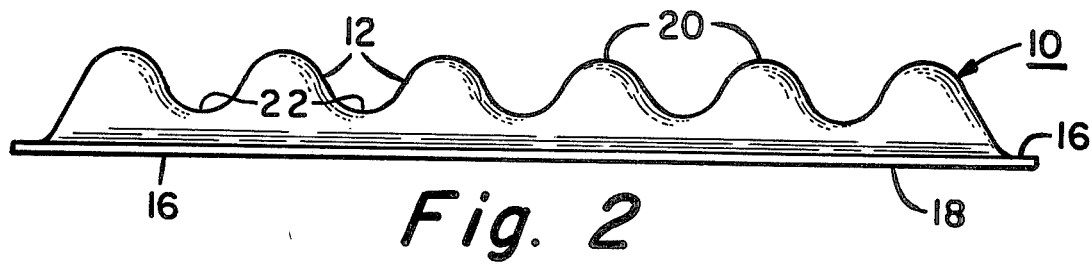
FIG. 2 is a longitudinal elevational view of the window taken along line 2—2 of FIG. 1.
Figure 3:
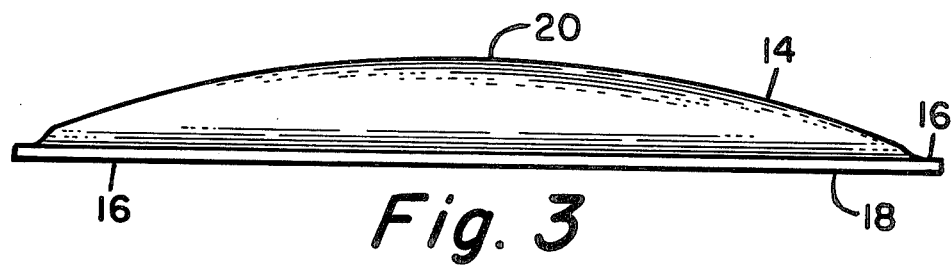
FIG. 3 is a lateral elevation view of the window taken along line 3—3 of FIG. 1.
Figure 4:
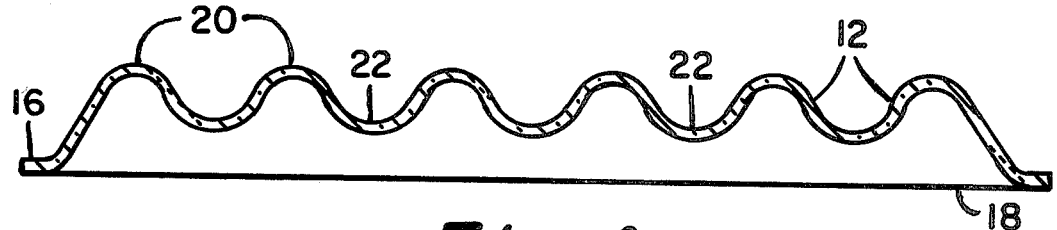
FIG. 4 is a longitudinal cross sectional view in elevation taken along line 4—4 of FIG. 1.

Referring now to the drawings, and particularly FIGS. 1-5, a contoured solar window 10 is disclosed having a plurality of corrugations 12 extending longitudinally thereof which are contoured laterally in the shape of paraboloids 14. The window is bounded by a peripheral sealing edge or flange portion 16 which lies within a lowermost plane 18. The corrugations 12 terminate at their upper extent in peaks 20 and at their lower extent in valleys 22, which valleys lie in a plane 24 parallel to and offset from the lowermost plane 18 of the peripheral support portion 16.

Figure 6:
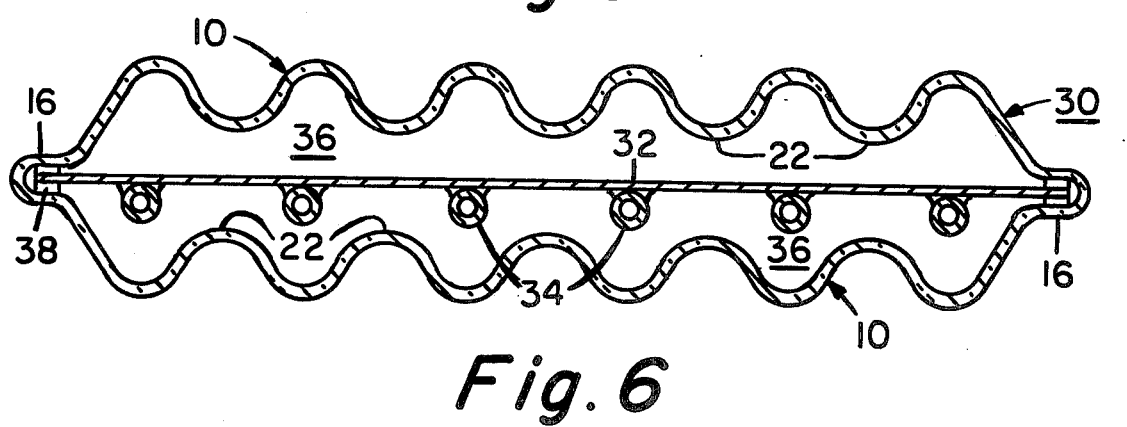
FIG. 6 is a longitudinal cross sectional view in elevation of an evacuated flat plate solar collector utilizing the improved solar window of the present invention.

Referring now to FIG. 6, an evacuated flat plate solar collector 30 is shown having a housing including a pair of upper and lower portions in the form of contoured solar windows 10 of the present invention. A collector plate or absorber 32 having a plurality of fluid channels 34 secured to an under surface thereof is shown positioned within a partially evacuated chamber 36 formed between said solar window 10. Although various sealing modes may be utilized as desired, in all cases, the contoured solar windows 10 are supported solely about their peripheral sealing edge or support flange portions 16 with central portions thereof being unsupported and out of contact with the collector plate 32. Since it is preferable to insulate the collector plate 32 from the solar windows 10, the windows themselves may be sealed together about their peripheral sealing edges 16 and the collector plate 32 is suitably supported by insulation means 38 from such peripheral support portions 16. Further, the collector plate may lie wholly within the evacuated chamber and merely be supported by spaced insulation on the peaks of the lower housing portion, if so desired.

Figure 5:
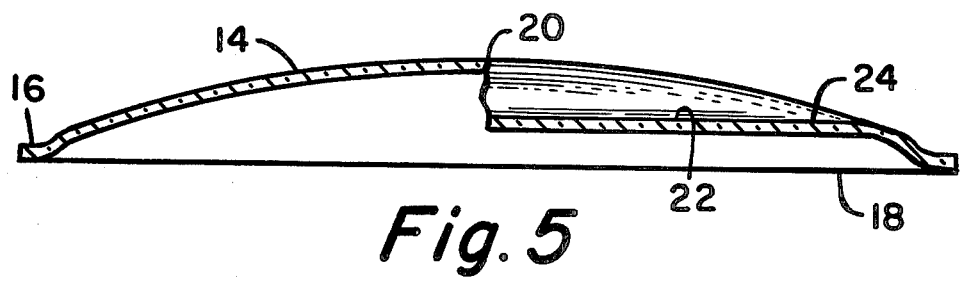
FIG. 5 is a lateral cross sectional view in elevation taken along line 5—5 of FIG. 1.

As will be noted from FIG. 6, the contoured solar windows 10 are supported solely at their peripheral sealing edge or flange portions 16 and are otherwise unsupported and spaced apart from the collector plate 32. The longitudinally spaced sinusoidal corrugations 12 are laterally contoured in the shape of paraboloids which provide a plurality of longitudinally spaced-apart constant stress beams extending laterally across the window 10 to form a solar window of minimum thickness strengthened glass material which can withstand the atmospheric forces exerted on the exterior thereof due to the evacuated chamber 36 formed interiorally thereof. The cross section of each corrugation 12 as shown in FIG. 5 is in the form of a parabola, so that the plurality of paraboloids, joined together along adjacent base portions, maximize the overall strength with a given minimum thickness of strengthened glass, and with a minimum amount of deformation of the strengthened glass.

As previously pointed out in Table I, a laminated or chemically strengthened glass permits the utilization of much thinner and accordingly much lighter glass sheet due to the higher modulus of rupture (MOR) or maximum allowable stress obtained. The laminated glasses utilized may be formed in accordance with the disclosure set forth in U.S. Pat. No. 3,673,049, whereas the chemically strengthened glasses may be obtained through utilization of the disclosure set forth in U.S. Pat. No. 3,790,430. Although other glasses may be utilized, the required increase in glass thickness and accordingly overall weight detract from both the optics and economy of utilizing such other glasses. Further, the lower window portion shown in FIG. 6 may be replaced with a suitably strengthened and insulated housing, since the solar collective aspects of the lower window are unimportant; however, we prefer the utilization of the double window structure shown in FIG. 6 due to the high strength to weight ratio obtained through utilization thereof. Further, the double window structure as shown in FIG. 6 may be utilized, without the solar collector components, as an insulating structure or cover for an enclosed chamber. Various absorbing coatings may be applied to the collector 32 and reflective coatings to the inner surface of the windows 10 as is known in the art to enhance the collection of solar energy upon absorber 32.

It can further be appreciated that with the valleys or base portions 22 of the constant stress beams represented by corrugations 12 lying within a plane 24 parallel to and vertically spaced apart from the plane 18 of the peripheral sealing edge or flange portion 16, that no part of the contoured upper sealing window 10 is in contact with or supported by the collector plate 32, with the exception of the peripheral sealing edge or flange portions 16 which insulatably support and position the collector plate.

Although the preferred embodiments of the invention have been set forth, it will be apparent to those skilled in the art that various changes and modifications may be made thereto without departing from the spirit and scope of the invention as defined in the appended claims.

We claim:

1. An evacuated flat plate solar collector comprising, means forming a housing for said evacuated flat plate solar collector, said housing means including an upper portion and a lower portion defining a partially evacuated chamber therebetween, solar energy collector plate means positioned within said chamber between said upper and lower housing portions, fluid channel means associated with said collector plate means for removing heat therefrom, said upper housing portion including a solar glass window contoured to provide sufficient strength to withstand the force of atmospheric pressure exerted on one side thereof, said contoured solar window having both a longitudinal and a lateral expanse bounded by peripheral support means lying within a first plane, said peripheral support means being sealably connected to the lower portion of said housing and providing the sole support for said contoured glass window, a plurality of laterally extending support beams spaced-apart longitudinally along said contoured glass window, said beams projecting arcuately outwardly from said planar support means at opposite ends thereof, each said support beam having a maximum bending stress not exceeding that obtained as a constant stress beam, said plurality of beams being joined along adjacent portions thereof to form a plurality of sinusoidal corrugations extending longitudinally along said solar window, the junctures of said adjacent beams lying in a second plane parallel to said first plane and vertically spaced apart therefrom, and said plurality of laterally extending beams, except where communicating with and projecting outwardly from said peripheral support means, being spaced apart from and out of contact with the remainder of said evacuated flat plate solar collector so as to inhibit conductive heat losses from the collector plate means to the solar window.

2. An evacuated flat plate solar collector as defined in claim 1 wherein said plurality of laterally extending support beams are in the form of parabaloidal constant stress beams positioned longitudinally along and extending laterally across said solar window between said peripheral support means so as to impart sufficient strength to such window so as to withstand the forces exerted on the surface thereof by atmospheric pressure.

3. An evacuated flat plate solar collector as defined in claim 1 wherein said contoured solar window is formed from a strengthened glass having a minimum MOR of 10,000 psi and a thickness sufficient to withstand the forces exerted on one surface thereof by atmospheric pressure.

4. A contoured insulating structure for use with an enclosed chamber comprising, a curvilinearly contoured sheet of glass having a longitudinal extent and a lateral extent, peripheral support and sealing portions lying in a first plane bounding said glass sheet; a plurality of support beams spaced apart along the longitudinal extent of said sheet, extending laterally thereof, and projecting arcuately outwardly from said first plane at opposed ends thereof; each said support beam having a maximum bending stress not exceeding that obtained as a constant stress beam, adjacent ones of said beams being joined at base portions thereof within a second plane parallel to and outwardly spaced apart from said first plane toward said arcuate projections such that said contoured insulating structure may be solely supported by said peripheral support portions and thereby inhibit conductive thermal losses to central portions thereof while simultaneously being able to withstand the forces of atmospheric pressure exerted upon one surface thereof, said plurality of joined beams providing a plurality of sinusoidal corrugations extending longitudinally of said sheet, and said plurality of support beams being arcuately contoured to form a plurality of substantially constant stress beams spaced apart along the longitudinal extent of said sheet and extending laterally thereof to thereby provide said sheet with sufficient strength to withstand atmospheric pressure while being supported solely about the peripheral portions thereof.

5. A contoured insulating structure for use with an enclosed chamber as defined in claim 4 wherein said contoured sheet of glass is formed of a strengthened glass having a minimum MOR of about 10,000 psi.

* * * * *

UNITED STATES PATENT AND TRADEMARK OFFICE
CERTIFICATE OF CORRECTION

PATENT NO. : 4,186,723
DATED : February 5, 1980
INVENTOR(S) : Frank T. Coppola, William P. Lentz and Robert V. VanDewoestine It is certified that error appears in the above-identified patent and that said Letters Patent are hereby corrected as shown below:

Column 1, line 52, "solor" should be changed to read --solar--; column 3, line 42, after "atmospheric" insert --pressure--; column 4, line 13, "window" should be changed to read --windows--.

Signed and Sealed this

Tenth Day of June 1980

[SEAL]

Attest:

SIDNEY A. DIAMOND

Attesting Officer

Commissioner of Patents and Trademarks